United States Patent
Nakano et al.

[19]

[11] Patent Number: 6,031,792
[45] Date of Patent: Feb. 29, 2000

[54] APPARATUS AND METHOD FOR SELECTIVELY REPRODUCING INFORMATION FROM DIFFERING RECORDING MEDIA

[75] Inventors: Satoshi Nakano; Junichi Suzuki, both of Kanagawa, Japan

[73] Assignee: Sony Corporation, Japan

[21] Appl. No.: 08/816,940

[22] Filed: Mar. 14, 1997

[30] Foreign Application Priority Data

Mar. 21, 1996 [JP] Japan .................................. 8-064145

[51] Int. Cl.[7] ................................ G11B 11/00; G11B 7/00
[52] U.S. Cl. ................................................ 369/13; 369/58
[58] Field of Search ................................ 369/15, 13, 120, 369/44.23, 112, 44.38, 110, 47, 109, 58–59, 54, 116, 44.37, 44.26, 275.1, 44.25, 44

[56] References Cited

U.S. PATENT DOCUMENTS

5,416,755 5/1995 Endo et al. .............................. 369/13
5,488,598 1/1996 Endo et al. .............................. 369/120
5,684,771 11/1997 Furukawa et al. ......................... 369/58

*Primary Examiner*—Ali Neyzari
*Attorney, Agent, or Firm*—Rader, Fishman & Grauer; Ronald P. Kananen

[57] ABSTRACT

A recording-medium reproducing apparatus in which different types of recording mediums can be reproduced by the single reproducing apparatus. The apparatus selectively reproduces information from a first recording medium by applying light to an information recording layer through a transparent substrate having a first thickness, and reproduces information from a second recording medium by applying light to an information recording layer through a transparent substrate having a second thickness. The apparatus has a light-generating device for generating light to be applied to the information recording layer of the recording medium. A light-applying device converges the light generated by the light-generating device and applies it to the information recording layer of the recording medium. A light-receiving device, which is divided into a central portion and a peripheral portion, separately receives the light reflected by the recording medium.

34 Claims, 11 Drawing Sheets

PRIOR ART

FIG. 8

PRIOR ART

PRIOR ART

FIG. 11

APPARATUS AND METHOD FOR SELECTIVELY REPRODUCING INFORMATION FROM DIFFERING RECORDING MEDIA

BACKGROUND OF THE INVENTION

1. Field of the Invention

The present invention relates generally to a recording-medium reproducing apparatus and a recording-medium reproducing method. More particularly, the invention relates to a recording-medium reproducing apparatus for reproducing recorded information from a plurality of types of disc-like recording mediums with substrates of different thicknesses. The invention is also concerned with a recording-medium reproducing method used in the above type of apparatus.

2. Description of the Related Art

As recording mediums from which information is reproduced by using light, in addition to compact discs (CD) (trade name) which are currently widely used, new recording mediums, such as digital video discs (DVD) having a much larger capacity than CDs, which are capable of recording long periods of video pictures in a digital form, are being considered. Digital information is optically read from the above type of recording medium in the following manner. Laser light is applied to the recording medium, and the reflected light from the medium is detected. Then, the level of reflected light is converted into binary data.

Figure 8:
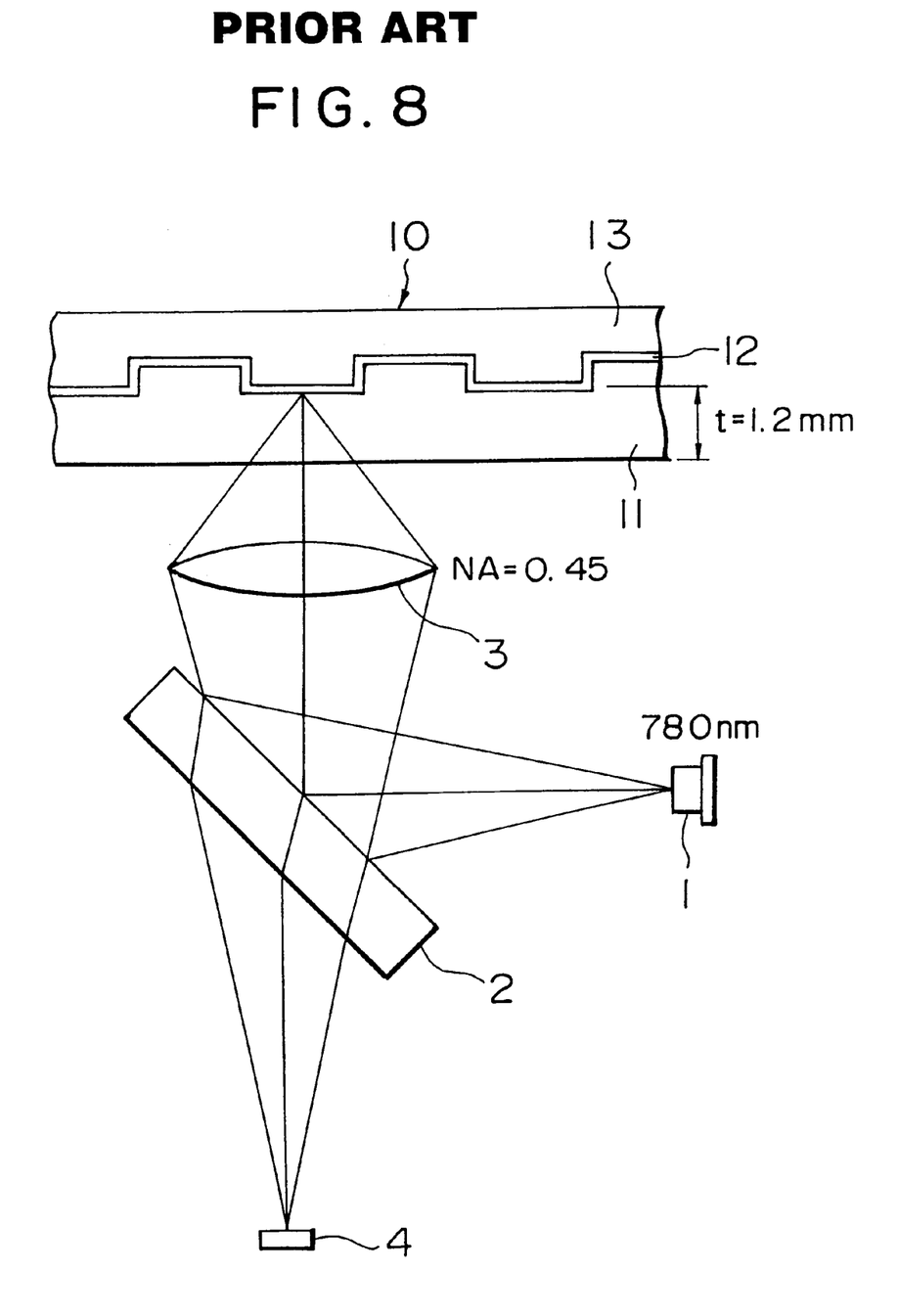
FIG. 8 is a schematic view illustrating an example of a known type of CD-designed optical pick-up device.

FIG. 8 illustrates an example of the construction of an optical pick-up device used for a CD. The optical pick-up device has a laser diode (LD) 1 emitting laser light having a wavelength of 780 nm. A beam splitter 2, formed of a transparent plane parallel plate, reflects the laser light emitted from the LD 1 toward an objective 3. The beam splitter 2 also provides astigmatism for the reflected light (convergent light) that is returned from a CD 10 via the objective 3 and transmits the light toward a photodiode 4.

The objective 3 converges the laser light and directs it onto an information recording layer 12 of the CD 10 on which miniscule pits are arranged. The objective 3 is also adapted to converge the light reflected from the information recording layer 12 of the CD 10 so as to apply the light to the photodiode 4 via the beam splitter 2. The objective 3 having a larger numerical aperture (NA) can converge light at a greater angle into a smaller area. In this example, the objective 3 having a NA of 0.45 is used.

The photodiode 4 is adapted to detect the laser light which has been applied to the CD 10 from the LD 1 and returned from the CD 10. Astigmatism is generated in the laser light reflected by the information recording layer 12 when the light passes through the beam splitter 2 before being incident on the photodiode 4. Focus servo control is performed by utilizing this astigmatism.

The CD 10 used as a recording medium is constructed in such a manner that the information recording layer 12 is formed on a transparent substrate 11 having a thickness t of 1.2 mm, and a protective film 13 is further deposited on the information recording layer 12. Laser light emitted from the LD 1 penetrates the substrate 11 and is further applied to the information recording layer 12. The information recording layer 12 has small pits corresponding to recorded information. Diffraction occurs to the laser light incident on the pits so as to lower the intensity of the returned light (the light reflected by the CD 10 and applied to the photodiode 4). On the other hand, laser light applied to the information recording layer 12 on which the pits are not formed is directly reflected to increase the intensity of the returned light. Such two types of returned light are detected by the photodiode 4, and the high and low levels of intensity of the light are converted into "1" and "0". As a consequence, digital data recorded as pits on the CD 10 can be read.

In this manner, recorded information can be read by applying laser light to predetermined positions in the recording medium and by further detecting the light returned from the medium.

In addition to the CD 10 discussed above, a DVD 20 constructed as shown in FIG. 9 has been proposed. In contrast to the CD 10 having information on only one side thereof, it is possible to record information on both sides of the DVD 20. More specifically, the DVD 20 is constructed of the following two blocks. An information recording layer 22 is formed on a transparent substrate 21, and a protective film 23 is further disposed on the information recording layer 22. Moreover, an information recording layer 32 is formed on a transparent substrate 31, and a protective film 33 is further deposited on the recording layer 32. The resulting two blocks are bonded in such a manner that the two protective films 23 and 33 opposedly face each other. Accordingly, the structure of the DVD 20 constructed as described above is symmetrical, as illustrated in FIG. 9.

Figure 9:
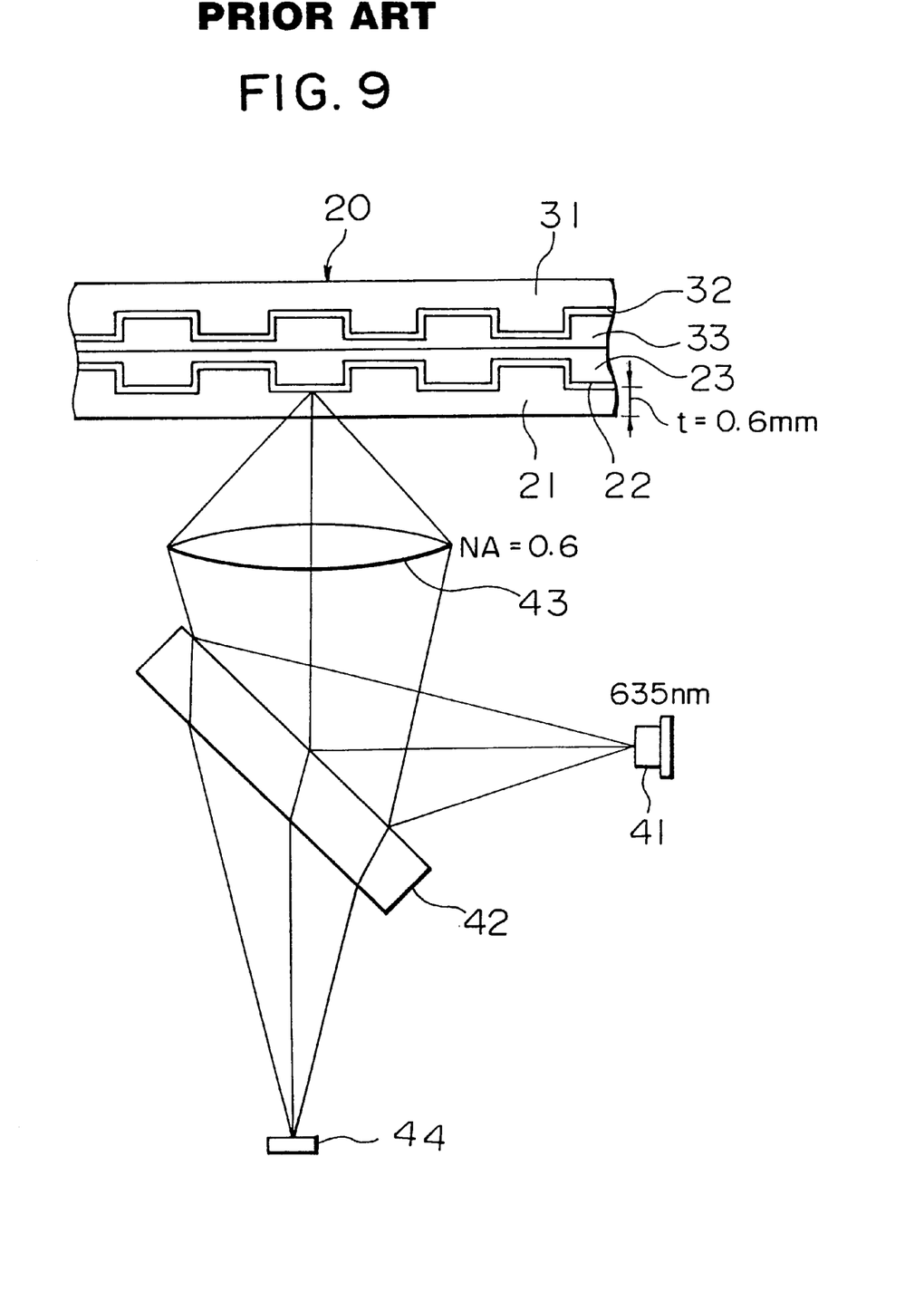
FIG. 9 is a schematic view illustrating an example of a DVD-designed optical pick-up device.

Since the DVD 20 can record information with higher density than the CD 10, the pit length and the pit gap of the DVD 20 are made smaller than those of the CD 10. Thus, an objective 43 having a larger NA (0.6) is used in a DVD-designed optical pick-up device, because light is applied to the more minute pits in the DVD 20. The use of the objective 43 having a larger NA (0.6) makes it possible to converge laser light into a smaller area so that the smaller pits can be read.

Because the above-described discs (such as the CD 10 and the DVD 20) are generally mass-produced, some discs (for example, polycarbonate-made inexpensive discs) are disadvantageously skewed by as much as 0.5 to 1 degree. Thus, the following problem is encountered when data reproduction is performed from such a skewed disc. Data reading is disadvantageously carried out by applying laser light and detecting the returned light while a disc is skewed from the optical axis, thereby causing wavefront aberration. This makes an image-forming spot on the disc asymmetrical, increasing interference between codes and further generating large distortion in an output signal, which may hamper correct data reading. The major aberration generated due to this disc skewing is third-order aberration, which is proportional to the cube of the NA, the angle of disc skewing, and the thickness of a substrate. Accordingly, third-order aberration is more responsive to disc skewing in accordance with a larger NA.

Thus, since reading is performed by an objective having a large NA (0.6) in the DVD 20, the third-order aberration is likely to increase by the use of a substrate having a thickness similar to that of the CD 10. In order to reduce the third-order aberration, the thicknesses of the substrates 21 and 31 are made smaller than the thickness of the substrate 11 of the CD 10. More specifically, the thickness of the substrates 21 and 31 of the DVD 20 are 0.6 mm, while the thickness of the substrate 11 of the CD 10 is 1.2 mm.

Further, the recording density of the DVD 20 is larger than that of the CD 10. Consequently, a LD 41 for use in a DVD-designed optical pick-up device is the one that emits laser light having a wavelength (635 nm) shorter than that emitted from the CD-designed LD 1. Additionally, the objective 43 having a larger NA is used.

According to the above description, information can be read from the CD 10 or the DVD 20 only by the use of an optical system (an optical pick-up device) designed specifically for the CD 10 or the DVD 20. It is difficult, however, to accurately read information from both the CD 10 and the DVD 20 with the use of only a single optical system.

Figure 10:
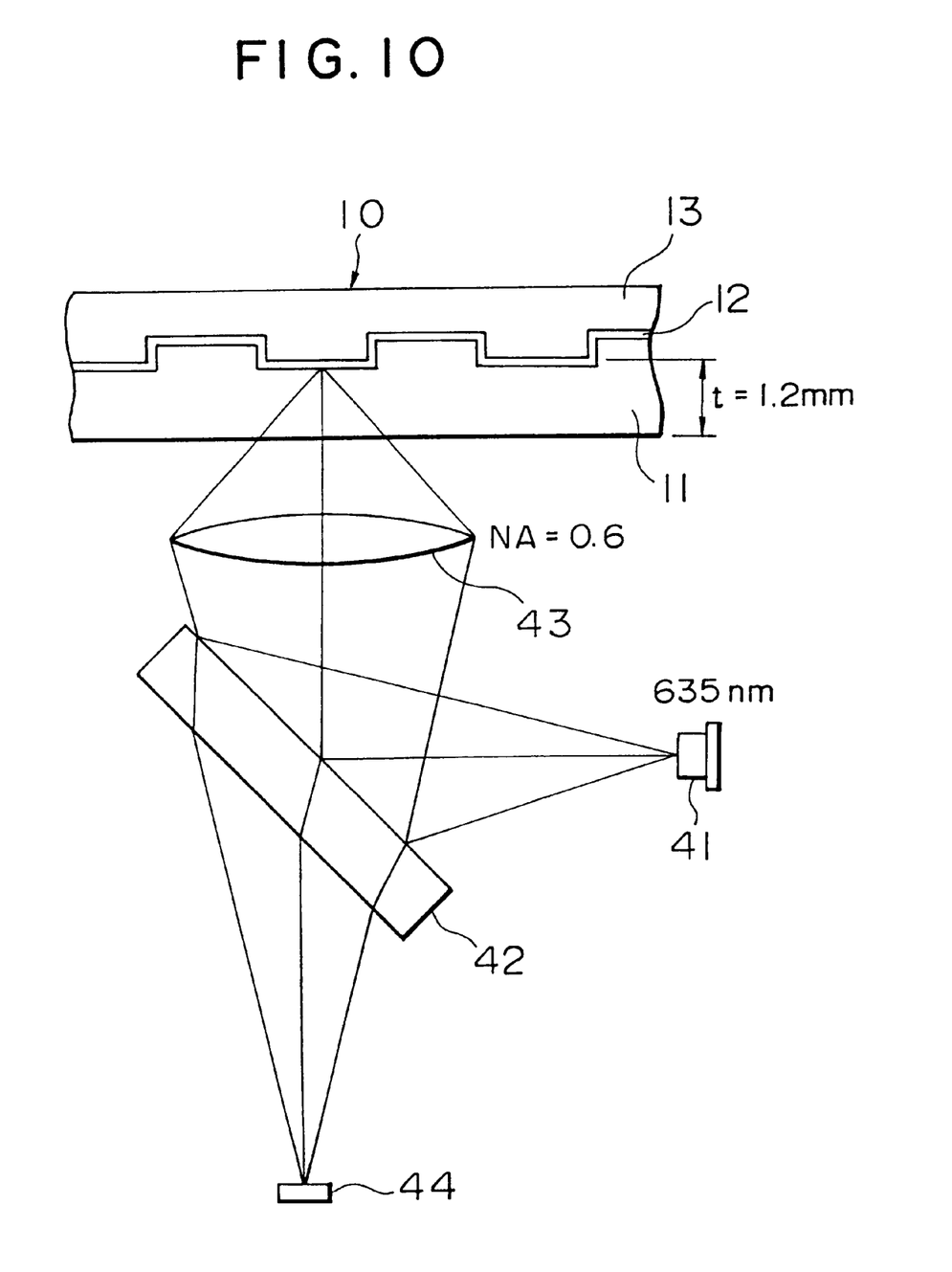
FIG. 10 illustrate the optical pick-up device shown in FIG. 9 applied to a CD.
Figure 11:
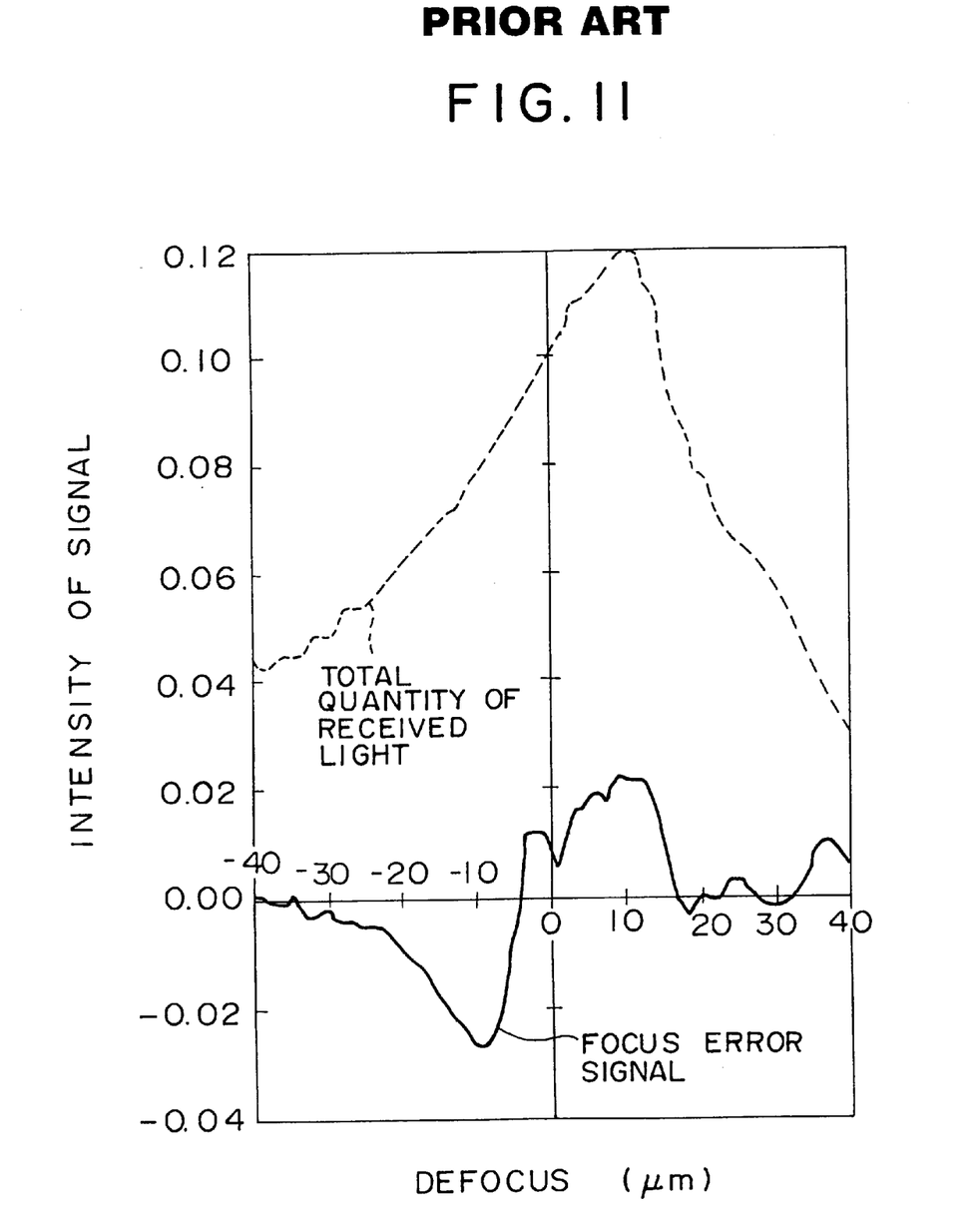
FIG. 11 is a diagram illustrating an example of a focus error signal and the total quantity of received light detected in the optical pick-up device shown in FIG. 9 applied to a CD.

For example, if an optical pick-up device designed specifically for a DVD is applied to the CD 10, as shown in FIG. 10, the following problems are presented. That is, if the optical pick-up device used for the DVD 20, which is optimized to read data stored in the DVD 20, reads data from the CD 10, an adverse influence of fourth-order aberration (proportional to the fourth power of the NA and the thickness of the substrate) is produced due to a difference in the thickness between the substrate 11 of the CD 10 and the substrates 21 and 31 of the DVD 20 and a difference in the NA between the objectives 3 and 43. This deteriorates the characteristics of a focus error signal used in the focus servo control (a correct focus error signal has symmetrical positive and negative peaks formed in an "S" shape in the vicinity of the focal position), as illustrated in FIG. 11, making it difficult to detect the focal position, thus failing to obtain a correct data signal (RF signal). Hence, it is difficult to perform the focus servo control, which may even hamper data detection.

To solve this problem, the present inventor previously proposed the following method, such as the one disclosed in Japanese Patent Application No. 7-302415. In this method, a small-sized photodetector is used in a CD to prevent the detection of the peripheral portion of returned light during data reading, which peripheral portion is particularly vulnerable to an adverse influence produced by spherical aberration. Thus, the adverse influence of spherical aberration can be inhibited, thereby making it possible to read data from a CD with a DVD-designed optical system. In this method, a photodiode is used, such as one sized to receive light returned from a DVD or a CD corresponding only to an NA of approximately 0.3 or lower.

However, when data is reproduced from a DVD according to the above-described method, this small-sized photodetector fails to obtain a sufficient level of output signal, unlike a known type of photodetector used for a DVD. This deteriorates the focus error signal and the data output signal (RF signal) when DVD reading is performed.

SUMMARY OF THE INVENTION

Accordingly, in view of the above background, it is an object of the present invention to provide an optical recording-medium reproducing apparatus having a photodetector divided into a central portion and a peripheral portion in which only an output of the central portion is used during CD reading, while an output of the overall photodetector (central portion and peripheral portion) is used during DVD reading so as to preserve a sufficient level of resulting signal obtained when DVD reading is performed, thereby enabling stabilized data reading from a plurality of types of recording mediums.

In order to achieve the above object, according to one form of the present invention, there is provided a recording-medium reproducing apparatus for selectively reproducing information from a first recording medium by applying light to an information recording layer through a transparent substrate having a first thickness, and reproducing information from a second recording medium by applying light to an information recording layer through a transparent substrate having a second thickness, the reproducing apparatus comprising: light-generating means for generating light to be applied to the information recording layer of the recording medium; light-applying means for converging the light generated by the light-generating means and applying it to the information recording layer of the recording medium; and light-receiving means divided into a central portion and a peripheral portion for separately receiving the light reflected by the recording medium.

According to another form of the present invention, there is provided a recording-medium reproducing apparatus for selectively reproducing information from a first recording medium by applying light to an information recording layer through a transparent substrate having a first thickness, and reproducing information from a second recording medium by applying light to an information recording layer through a transparent substrate having a second thickness, the reproducing apparatus comprising: a laser diode for generating light to be applied to the information recording layer of the recording medium; light-converging means for converging the light generated by the laser diode and applying it to the information recording layer of the recording medium; a beam splitter for separating the light reflected by the recording medium from the light generated by the laser diode; determination means for determining the type of the recording medium; and light-receiving means for receiving the light reflected by the recording medium and separated by the beam splitter, including a first light-receiving portion divided into a plurality of regions and a second light-receiving portion disposed to surround the first light-receiving portion.

According to a further form of the present invention, there is provided a recording-medium reproducing method for selectively reproducing information from a first recording medium by applying light to an information recording layer through a transparent substrate having a first thickness, and reproducing information from a second recording medium by applying light to an information recording layer through a transparent substrate having a second thickness, the method comprising the steps of: generating light to be applied to the information recording layer of the recording medium; converging the light and applying it to the information recording layer of the recording medium; determining the type of the recording medium by recording-medium determining means; receiving the light reflected by the recording medium by a first light-receiving portion divided into a plurality of regions and a second-light receiving portion disposed to surround the first light-receiving portion; and performing a focus servo control based on the result obtained by the recording-medium determining means.

DESCRIPTION OF THE PREFERRED EMBODIMENTS

A detailed description will now be given of embodiments of the present invention with reference the drawings.

Figure 1:
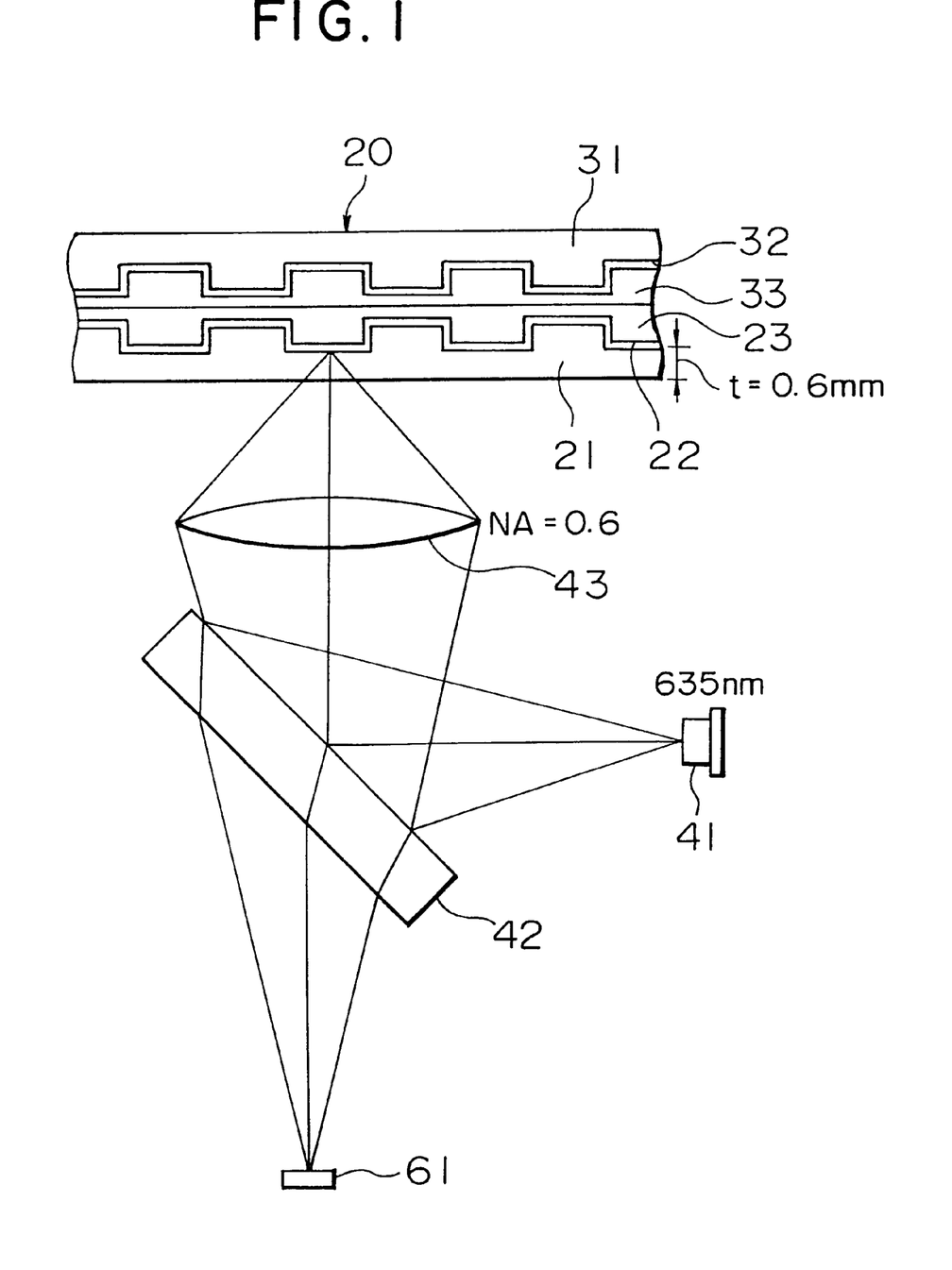
FIG. 1 is a schematic view illustrating an example of the construction of an optical pick-up device for use in a recording-medium reproducing apparatus according to an embodiment of the present invention.

FIG. 1 is a schematic view illustrating an optical pick-up device for use in a recording-medium reproducing apparatus according to an embodiment of the present invention. This optical pick-up device, as well as the device shown in FIG. 9, has a LD (light-generating means) 41 for generating laser light having a wavelength of 635 nm, a beam splitter 42 for separating incident light from reflected light and also providing astigmatism for the reflected light, an objective (light-applying means) 43 having a NA of 0.6, and a photodiode (light-receiving means) 61 for receiving the reflected light. In this embodiment, an explanation will be given using the CD 10 and the DVD 20 as two types of discs with substrates of different thicknesses.

In the optical pick-up device constructed as described above, laser light emitted from the LD 41 is reflected by the beam splitter 42 and further impinges on the objective 43. Then, the objective 43 converges the incident light at an angle corresponding to an NA of 0.6, enabling the light to pass through the transparent substrate 21 and be incident on the information recording layer 22 of the DVD 20. The reflected light (returned light) from the information recording layer 22 is again converged by the objective 43 and strikes on the beam splitter 42. The beam splitter 42 provides astigmatism for the returned light and transmits it toward the photodiode 61.

Figure 2:
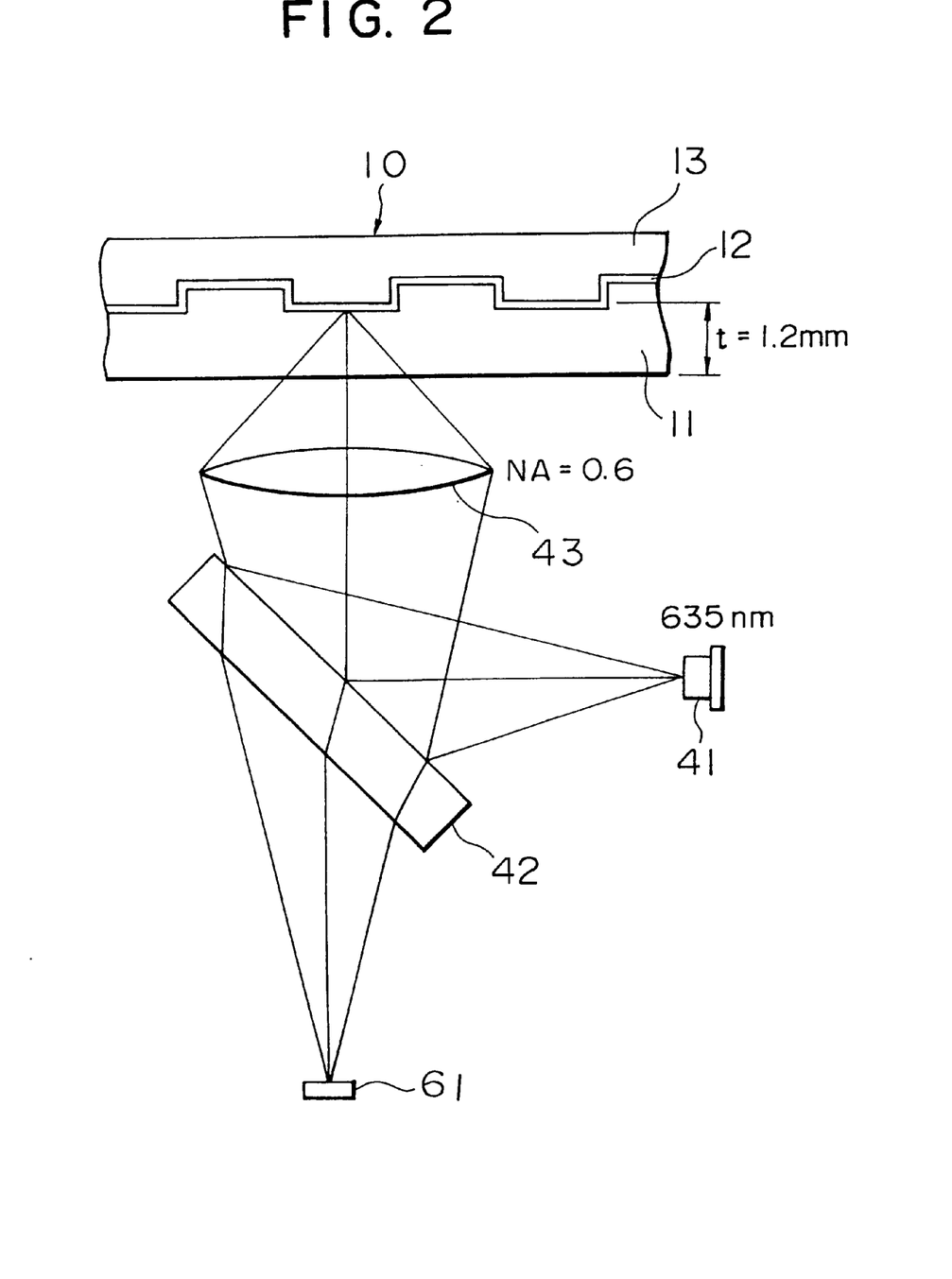
FIG. 2 illustrates the embodiment shown in FIG. 1 applied to a CD.

FIG. 2 illustrates the optical pick-up device shown in FIG. 1 applied to the CD 10. The CD 10 is constructed in such a manner that an information recording layer 12 is formed on a transparent substrate 11 having a thickness t of 1.2 mm, and a protective film 13 is disposed on the information recording layer 12.

In a manner similar to the DVD reading operation (FIG. 1), laser light emitted from the LD 41 is reflected by the beam splitter 42 and impinges on the objective 43. Then, the objective 43 converges the incident laser light at an angle associated with an NA of 0.6, and permits the light to penetrate the transparent substrate 11 and applies it to the information recording layer 12. The reflected light (returned light) from the recording layer 12 is again converged by the objective 43 and is incident on the beam splitter 42. The beam splitter 42 then provides astigmatism for the returned light and transmits it toward the photodiode 61.

In this embodiment, since the LD 41 and the objective 43 designed specifically for a DVD are used, the returned light (particularly, its peripheral portion) from the CD 10 is adversely influenced by the fourth-order spherical aberration.

Figure 3:
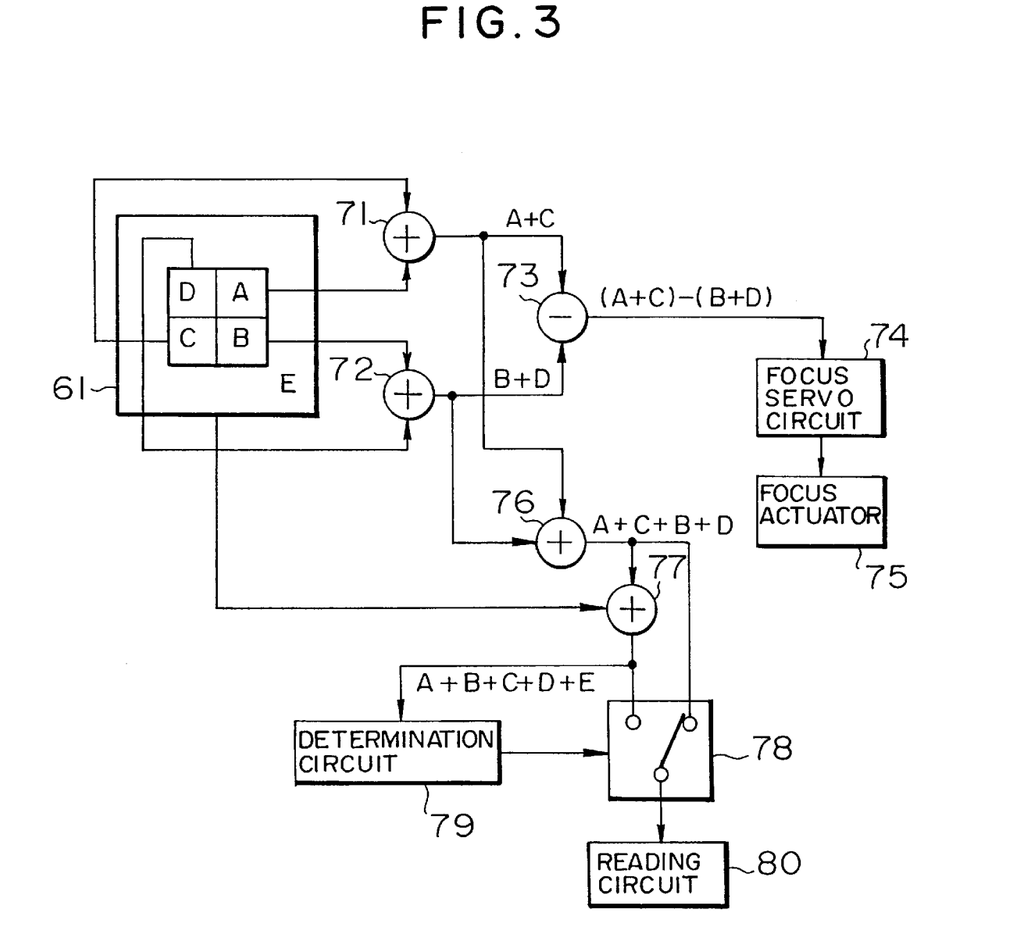
FIG. 3 is a block diagram illustrating an example of the electrical configuration of the embodiment shown in FIG. 1.

FIG. 3 illustrates an example of the electrical configuration of this embodiment. In this embodiment, data reading is performed while the focus servo control is exercised according to the astigmatism method using the astigmatic characteristics of the returned light.

More specifically, the photodiode 61 is divided, as illustrated in FIG. 3, into four central regions A through D and a peripheral region E, in each of which the returned light is converted into an electric signal. It should be noted that the total size of the central regions A through D of the photodiode 61 is set to about two thirds of the size of a spot obtained by applying the returned light to the diode 61 during DVD reading. In practice, the central regions A through D are set to be sized ranging from 3 to 16 $\mu$m in terms of the normalized detector size (obtained by dividing the actual dimensions by the transverse magnification of the objective 43), thereby reducing an adverse influence produced by aberrations. More preferably, if the size of the central regions A through D of the photodiode 61 is determined to range from 8 to 14 $\mu$m, an adequate level of signal without disturbance from the aberrations can be obtained. With this arrangement, while CD reading is performed, the peripheral portion of the returned light influenced by the spherical aberration is incident on the peripheral region E of the photodiode 61.

An explanation will first be given of the focus servo control performed in the reproducing apparatus with the electrical configuration shown in FIG. 3. Focus servo control is performed by utilizing outputs of the four central regions A through D of the photodiode 61. The irradiating light returned from the CD 10 is converted into electric signals in the individual central regions A through D. Subsequently, the outputs (A+C) of the regions A and C and the outputs (B+D) of the regions B and D are respectively added in adders 71 and 72, and a difference of the two outputs ((A+C) and (B+D)) is calculated in a subtracter 73. Then, the calculated difference ((A+C)−(B+D)) is output to a focus servo circuit (control means) 74 as a focus error signal.

When the spot of the returned light applied to the photodiode 61 is circular, the resulting focus error signal supplied to the focus servo circuit 74 indicates zero. Further, when the spot of the returned light is an ellipse having an axis elongated in the directions of the regions B and D, the focus error signal becomes negative at a predetermined level. In contrast, if the spot of the returned light is shaped as an ellipse having an axis elongated in the directions of the regions A and C, the focus error signal becomes positive at a predetermined level.

Consequently, the focus servo circuit 74 controls a focus actuator 75 in response to the sign and the level of the focus error signal, and causes the actuator 75 to shift the objective 43 to the optical axis.

In this manner, the direction and quantity of the focus error can be detected by comparing the light quantity detected in the regions A and C of the photodiode 61 with the light quantity detected in the regions B and D. Accordingly, the objective 43 is shifted in accordance with the error information. Focus servo control can thus be performed.

The data reading operation conducted in this embodiment will now be described. The photodiode 61 receives the returned light (data detection) from the DVD 20 or the CD 10 while in-focus state is kept under servo control, as discussed above.

The total output of the regions A through D of the photodiode 61 is first added in the adders 71, 72 and 76. Thereafter, an adder 77 adds an output of the region E to the total output of the regions A through D so as to supply the resulting sum to a determination circuit 79. The determination circuit 79 stores as a reference twice the output voltage (the voltage is obtained by smoothing a signal indicating the total output of the regions A through D) obtained during CD reading. Upon comparison of the voltage of a smoothed signal with the reference (the voltage of a smoothed signal achieved during DVD reading is three times as large as that obtained during CD reading), the circuit 79 determines the type of recording medium. If the output voltage is greater than the reference, the recording medium is determined to be a DVD. In contrast, if the output voltage is smaller than the reference, the recording medium is determined to be a CD.

According to the determination result, the determination circuit 79 controls a switching circuit 78 in the following manner. During CD reading, the switching circuit 78 selects the output of the adder 76 (total output of the regions A through D) and supplies it to a reading circuit (reproduction means) 80. During DVD reading, the switching circuit 78 selects the output of the adder 77 (total output of the regions A through E) and feeds it to the reading circuit 80. The reading circuit 80 then executes predetermined processing on the supplied signal to reproduce the information recorded on the recording medium.

Figure 4:
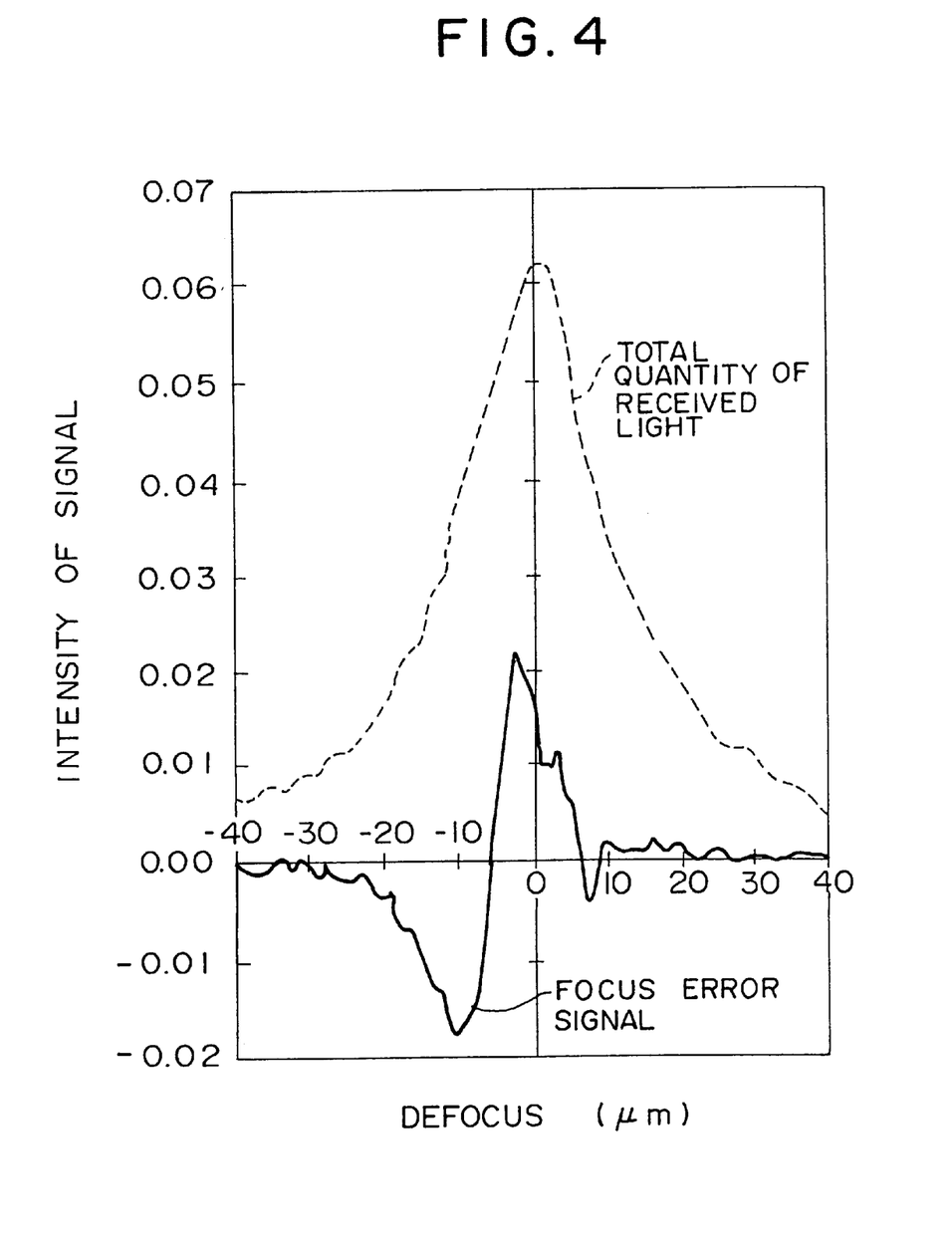
FIG. 4 is a diagram illustrating an example of a focus error signal and the total quantity of received light detected in the embodiment shown in FIG. 1.

FIG. 4 illustrates an example of the relationship between the displacement (defocus) from the focal position and the intensity of the focus error signal ((A+C)−(B+D)) and the total quantity of received light when CD reading is performed according to this embodiment.

FIG. 4 indicates that the focus error signal presents sharp peaks in the vicinity of the focal position during CD reading, substantially free from an adverse influence of the spherical aberration, because the returned light is received only by the central regions A through D of the photodiode 61. Thus, a higher level of RF signal can be obtained as compared with a signal resulting from the returned light detected in the regions A through D of the photodiode 61. In contrast, during DVD reading, an RF signal can be attained by receiving returned light by all the regions A through E of the photodiode 61.

In this fashion, while CD reading is performed, data detection is carried out only by the outputs of the central regions A through D of the photodiode 61 without utilizing the output of the peripheral region E which is seriously affected by the spherical aberration. On the other hand, while DVD reading is conducted, the output of the peripheral region E, as well as the outputs of the central regions A through D, can be used to acquire a data detection signal (RF signal) with a voltage greater than that resulting from CD reading.

Figure 5:
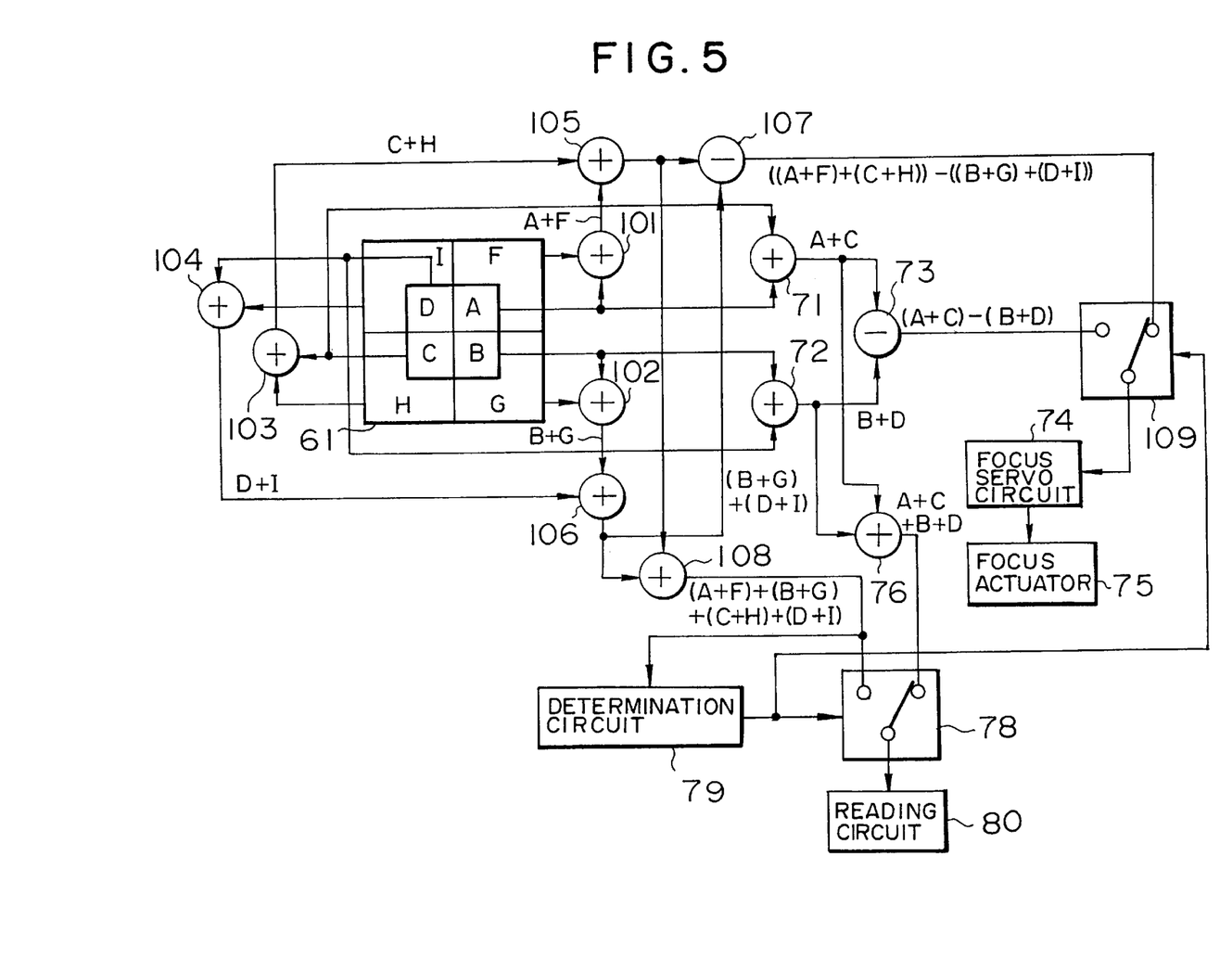
FIG. 5 is a block diagram illustrating another example of the electrical configuration of the embodiment shown in FIG. 1.

Another example of the electrical configuration of this embodiment is shown in FIG. 5. In this configuration, the photodiode 61 is divided into four central regions A through D and four peripheral regions F through I.

An explanation will first be given of focus servo control exerted in the reproducing apparatus shown in FIG. 5 in this embodiment. The individual central regions A through D of the photodiode 61 convert the returned light from a recording medium into electric signals. Then, the outputs (B+D) of the regions B and D and the outputs (A+C) of the regions A and C are respectively added in adders 71 and 72, and a difference of the respective outputs (((A+C)−(B+D)) is calculated in a subtracter 73. The calculated difference is then output to a switching circuit 109 as a focus error signal generated when CD reading is carried out.

The individual peripheral regions F through I of the photodiode 61 convert the returned light from a recording medium into electric signals. Subsequently, adders 101 through 104 respectively add the outputs (A+F) of the regions A and F, the outputs (B+G) of the regions B and G, the outputs (C+H) of the regions C and H, and the outputs (D+I) of the regions D and I.

The adders 101 and 103 output the resulting sums (A+F) and (C+H), respectively, to an adder 105, which then further performs a calculation to obtain the sum ((A+F)+(C+H)) and outputs it to a subtracter 107 and an adder 108. Moreover, the adders 102 and 104 output the resulting sums (B+G) and (D+I), respectively, to an adder 106, which then further conducts a calculation to obtain the sum ((B+G)+(D+I)) and outputs it to the subtracter 107 and the adder 108.

The subtracter 107 calculates a difference between a signal from the adder 105 and a signal from the adder 106 and outputs a calculated difference (((A+F)+(C+H))−((B+G)+(D+I))) to the switching circuit 109 as a focus error signal produced during DVD reading.

A determination circuit 79 performs a smoothing operation on an RF signal representing the sum (A+B+C+D+F+G+H+I) of total outputs of the central regions A through D and outputs of the peripheral regions F through I supplied from the adder 108. Upon comparison of the voltage of the smoothed RF signal with a reference stored therein in advance, the determination circuit 79 determines the type of recording medium (CD or DVD) from which information is currently read.

According to the determination result, the circuit 79 controls the switching circuit 109 in the following manner: the circuit 109 selects the output of the subtracter 73 and supplies it to the focus servo circuit 74 if the recording medium is determined to be a CD, while the circuit 109 selects the output of the subtracter 107 and feeds it to the focus servo circuit 74 if the recording medium is determined to be a DVD.

When the spot of the returned light applied to the photodiode 61 is circular-shaped, the focus error signal supplied to the focus servo circuit 74 indicates zero. If the spot of the returned light is an ellipse having an axis elongated in the directions of the regions B and D (or the regions G and I), the focus error signal becomes negative at a predetermined level. In contrast, if the spot of the returned light is an ellipse having an axis elongated in the directions of the regions A and C (or the regions F and H), the focus error signal becomes positive at a predetermined level.

The focus servo circuit 74 controls the focus actuator 75 according to the sign (positive or negative) and level of the focus error signal so as to cause the actuator 75 to shift the objective 43 to the optical axis.

As discussed above, while CD reading is conducted, the light quantity detected in the regions B and D of the photodiode 61 is compared with the light quantity detected in the regions A and C. In contrast, when DVD reading is carried out, the light amount detected in the regions B, G, D and I is compared with the light amount detected in the regions A, F, C and H. As a consequence, the direction and quantity of the focus error can be detected, and the objective 43 is shifted in response to this error information. Focus servo control is performed in this manner.

Accordingly, in the above-described configuration of the reproducing apparatus, both the output of the central regions and the output of the peripheral regions of the photodiode 61 can be utilized during DVD reading to obtain a focus error signal exhibiting good characteristics.

The reading operation performed in the reproducing apparatus with the electrical configuration shown in FIG. 5 will now be described. The photodiode 61 receives the returned light from the DVD 20 or the CD 10 (data detection) while in-focus state is preserved under focus servo control in the aforedescribed manner.

The outputs of the central regions A through D of the photodiode 61 are first added in the adders 71, 72 and 76. The adder 76 then outputs the sum (A+B+C+D) to a switching circuit 78 as a data detection signal (RF signal) resulting from CD reading. In contrast, the adder 108 performs a calculation to obtain the total output of all the central regions A through D and the peripheral regions F through I of the photodiode 61 supplied from the adders 105 and 106, and outputs the sum to the switching circuit 78 and the determination circuit 79 as a data detection signal (RF signal) obtained during DVD reading.

The determination circuit 79 controls the switching circuit 78 in a manner similar to the switching circuit 109: the output of the adder 76 (the total output of the regions A through D) is supplied to the reading circuit 80 during CD reading, while the output of the adder 108 (the total output of the central regions A through D and the peripheral regions F through I) is fed to the reading circuit 80 while DVD reading is performed. Thereafter, the reading circuit 80 executes predetermined processing on the supplied signal (RF signal) to reproduce the information recorded on the recording medium.

According to the above description, when CD reading is carried out, focus servo control and data detection are performed by utilizing the outputs of the central regions A through D of the photodiode 61 rather than the outputs of the peripheral regions F through I susceptible to the spherical aberration. When DVD reading is conducted, however, the outputs of the peripheral regions F through I, as well as the outputs of the central regions A through D, are used to obtain a focus error signal and a data detection signal (RF signal), both of which exhibit better characteristics than those generated when CD reading is performed.

Figure 6:
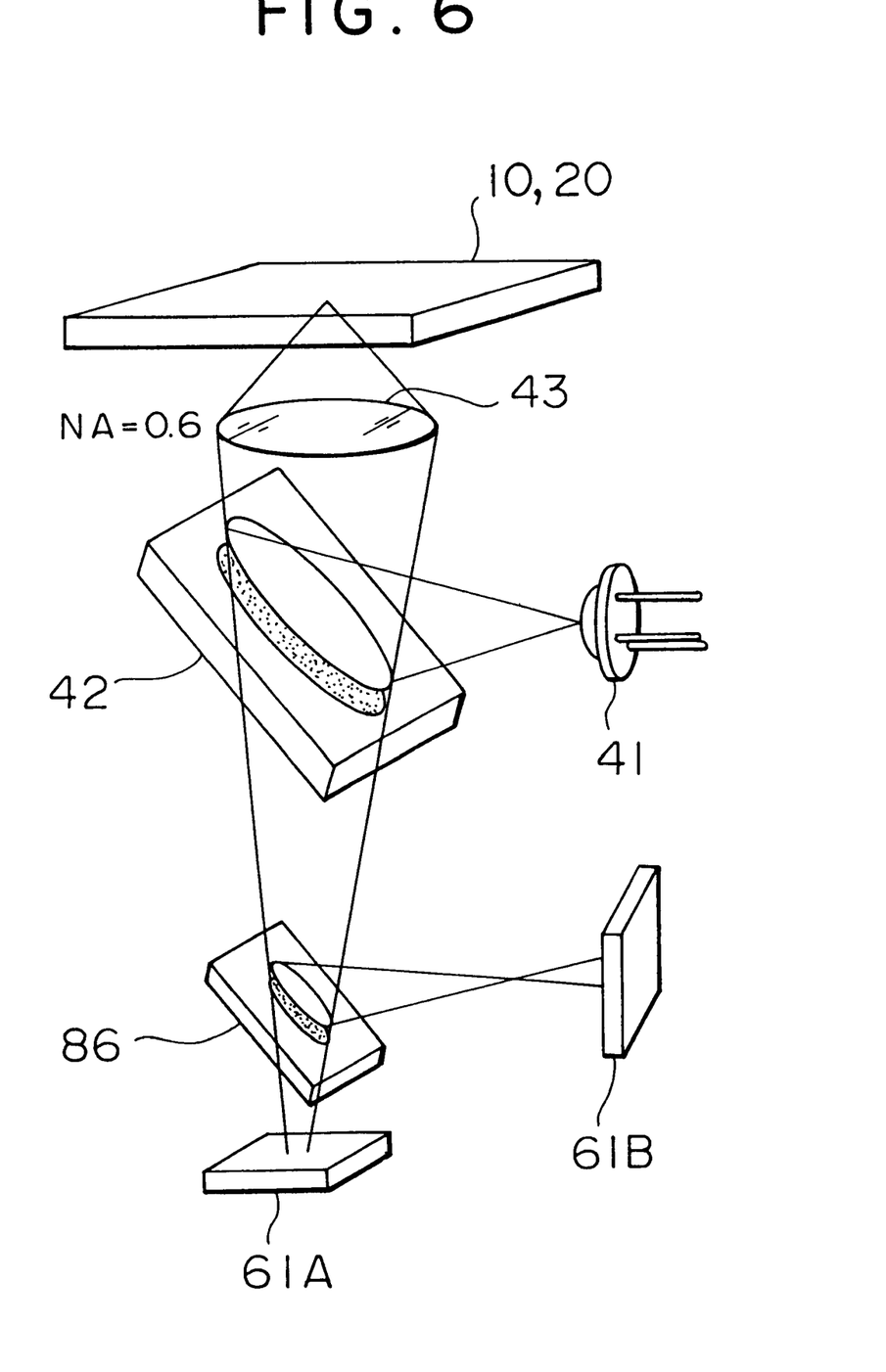
FIG. 6 illustrates an example of the construction of an optical pick-up device for use in a recording-medium reproducing apparatus according to another embodiment of the present invention.

FIG. 6 illustrates an example of the construction of an optical pick-up device for use in a recording-medium reproducing apparatus according to another embodiment of the present invention. In this embodiment, a beam splitter 42 formed of a transparent plane parallel plate reflects laser light emitted from an LD 41 onto an objective 43, and further transmits the light reflected from the CD 10 or the DVD 20 returned via the objective 43 toward photodiodes 61A and 61B (light-receiving means) via a beam splitter 86.

The beam splitter 86 splits the returned light passing through the beam splitter 42 into two beams, and transmits one beam toward the photodiode 61A and reflects the other beam on the photodiode 61B.

Figure 7:
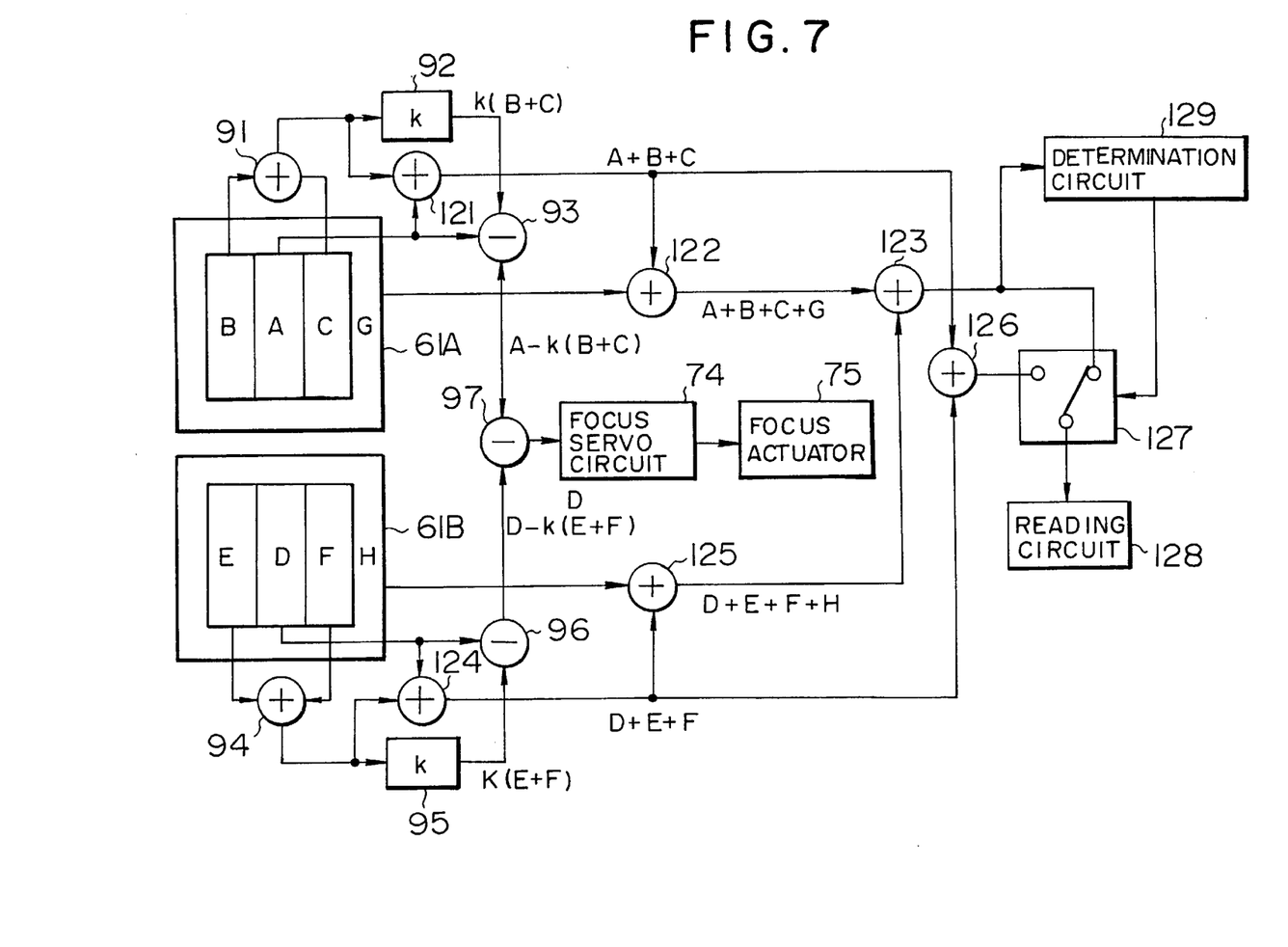
FIG. 7 is a block diagram illustrating an example of the electrical configuration of the embodiment shown in FIG. 6.

An example of the electrical configuration of the embodiment shown in FIG. 6 is illustrated in FIG. 7. In this embodiment, focus servo control is executed according to the differential concentric-circle method. The photodiode 61A has three central regions A, B and C and a peripheral region G, while the photodiode 61B has three central regions D, E and F and a peripheral region H.

The individual regions A through H convert the returned light from a recording medium into electric signals. Then, the outputs (B+C) of the regions B and C of the photodiode 61A are added in an adder 91 and supplied to a coefficient-multiplying unit 92. The coefficient-multiplying unit 92 multiplies the supplied signal by a coefficient k and outputs the resultant value (kx(B+C)) to a subtracter 93. The subtracter 93 then calculates a difference (A−kx(B+C)) between the signal from the coefficient-multiplying unit 92 and the signal output from the region A of the photodiode 61A, and outputs the difference to a subtracter 97.

Similarly, the outputs (E+F) of the regions E and F of the photodiode 61B are added in an adder 94 and then fed to a coefficient-multiplying unit 95. The unit 95 multiplies the fed signal by the coefficient k and outputs the resulting value (kx(E+F)) to a subtracter 96. Subsequently, the subtracter 96 calculates a difference (D−kx(E+F)) between the signal supplied from the coefficient-multiplying unit 95 and the signal output from the region D of the photodiode 61B, and outputs the difference to the subtracter 97.

The subtracter 97 further performs a calculation to obtain a difference between the above-described signal differences ((A−kx(B+C))−(D−kx(E+F)) and outputs it to a focus servo circuit 74 as a focus error signal.

When the spot of the returned light applied to the photodiode 61A has the same size as that of the light impinging on the photodiode 61B, the focus error signal fed to the focus servo circuit 74 represents zero. If the spot size of the returned light incident on the photodiode 61A is larger than that of the light impinging on the photodiode 61B, the focus error signal becomes positive at a predetermined level. In contrast, if the spot size of the returned light striking on the photodiode 61A is smaller than that of the light applied to the photodiode 61B, the focus error signal becomes negative at a predetermined level.

Thus, the focus servo circuit 74 controls a focus actuator 75 in response to the sign and level of the focus error signal so as to cause the actuator 75 to shift the objective 43 to the optical axis.

Hence, the direction and quantity of the focus error can be calculated by the light quantity detected in the respective regions A through F of the photodiodes 61A and 61B, and the objective 43 is shifted according to this error information. Focus servo control is performed in this manner.

The reading operation carried out in the reproducing apparatus with the electrical configuration shown in FIG. 7 will further be explained. An adder 121 carries out a calculation to obtain the total output of the regions A, B and C of the photodiode 61A from the output (B+C) of the adder 91 and the output of the region A of the photodiode 61A. Then, the adder 121 supplies the total output (A+B+C) to adders 122 and 126. Moreover, an adder 124 conducts a calculation to acquire the total output of the regions D, E and F of the photodiode 61B from the output (E+F) of the adder 94 and the output of the region D. The total output (D+E+F) is then sent to the adders 125 and 126. Then, the adder 126 performs a calculation to obtain the sum of the signals supplied from the respective adders 121 and 124, and outputs the resulting sum (A+B+C+D+E+F) to a switching circuit 127 as a data detection signal (RF signal) obtained by CD reading.

On the other hand, the adder 122 adds the output of the peripheral region G of the photodiode 61A to the total output (A+B+C) of the regions A, B and C fed from the adder 121. The sum (A+B+C+G) is then output to the adder 123. Further, the adder 125 adds the output of the peripheral region H of the photodiode 61B to the total output (D+E+F) of the regions D, E and F supplied from the adder 124. The sum (D+E+F+H) is then output to the adder 123. Thereafter, the adder 123 performs a calculation to obtain the sum of the signals fed from the respective adders 122 and 125, and outputs the resulting sum (A+B+C+D+E+F+G+H) to the switching circuit 127 and a determination circuit 129 as a data detection signal (RF signal) acquired by DVD reading.

The determination circuit 129, as well as the determination circuit 79 shown in FIG. 3, has stored twice the output voltage obtained by CD reading as a reference. Thus, upon comparison of the voltage obtained by smoothing the supplied signal with the reference, the determination circuit 129 determines the type of recording medium.

In accordance with the determination result, the determination circuit 129 controls the switching circuit 127 in the following manner. When the recording medium is determined to be a CD, the switching circuit 127 selects the output (the sum of the outputs of the regions A through F of the photodiodes 61A and 61B) of the adder 126 and supplies it to a reading circuit (reproduction means) 128. In contrast, if the recording medium is determined to be a DVD, the switching circuit 127 selects the output (the sum of the outputs of the regions A through H) of the adder 123 and feeds it to the reading circuit 128.

The reading circuit 128 then executes predetermined processing on the supplied signal (RF signal) to reproduce the information recorded on the recording medium.

In this fashion, while CD reading is performed, data detection is conducted by only utilizing the outputs of the central regions A through F of the photodiodes 61A and 61B without using the outputs of the peripheral regions G and H which are adversely influenced by the spherical aberration. In contrast, while DVD reading is carried out, not only the outputs of the central regions A through F, but also the outputs of the peripheral regions G and H, are used to achieve an output whose voltage is larger than the voltage resulting from CD reading.

The foregoing embodiments have been explained in which two types of discs, such as a CD and a DVD, are selectively reproduced. This is not, however, exclusive, and the present invention is applicable to cases where more than two types of discs are reproduced or recording mediums other than discs are reproduced.

What is claimed is:

1. An apparatus adapted for selectively reproducing information from a recording medium selected from a plurality of differing media types by applying light to an information recording layer through a transparent substrate having a thickness, said apparatus comprising:
   light-generating means for generating light to be applied to the information recording layer of the recording medium;
   light-applying means for converging the light generated by said light-generating means and applying it to the information recording layer of said recording medium;
   light-receiving means for receiving the light reflected by said recording medium; and
   a discriminator operably interconnected with the light-receiving means including focus-measuring means for measuring the focus of the light reflected by said recording medium, wherein the focus-measuring means is adapted to generate a media type signal representative of the focus of the light reflected by the recording medium whereby the media type signal indicates which of the plurality of differing media types comprises the recording medium.

2. An apparatus according to claim 1, wherein said light-receiving means is divided into a first portion and a second portion, and is constructed in such a manner that said first portion is divided into a plurality of regions and said second portion is disposed to surround said first portion whereby the focus-measuring means measures the differential quantities of light received by the first and second portions.

3. An apparatus according to claim 2, further comprising control means for performing a focus servo control in accordance with the quantity of light received by the first portion of said light-receiving means.

4. An apparatus according to claim 1, wherein the light-receiving means is divided into a first portion and a second portion, and further comprising control means for selectively performing a focus servo control in accordance with the quantity of light received by one of the first portion and the first and the second portions of said light-receiving means when said recording medium is reproduced depending upon the type of recording medium identified by the discriminator.

5. An apparatus according to claim 1, further comprising reproduction means for selectively reproducing the information recorded on said recording medium responsive to the media type signal.

6. An apparatus according to claim 1, wherein the normalized detector size of the first portion of said light-receiving means ranges from 3 to 16 $\mu$m.

7. An apparatus according to claim 1, wherein the recording density of said recording medium differs from the recording density of the other of the plurality of types of recording media.

8. An apparatus according to claim 1, wherein the thickness of the substrate forming said recording medium differs from the thickness of the substrate of the other of the plurality of types of recording media.

9. An apparatus according to claim 1, wherein said recording medium is selected from a plurality of types of recording media consisting of: a digital video disc and a compact disc.

10. An apparatus for selectively reproducing information from a medium selected from a plurality of differing media types by applying light to an information recording layer through a transparent substrate having a first thickness, said apparatus comprising:
    a laser diode for generating light to be applied to the information recording layer of the recording medium;
    light-converging means for converging the light generated by said laser diode and applying it to the information recording layer of said recording medium;
    a beam splitter for separating the light reflected by said recording medium from the light generated by said laser diode;
    light-receiving means for receiving the light reflected by said recording medium and separated by said beam splitter, including a first light-receiving portion having a periphery and divided into a plurality of regions and a second light-receiving portion disposed to wholly surround the periphery of said first light-receiving portion; and
    a discriminator operably interconnected with the light-receiving means for determining which of the plurality of differing media types comprises the recording medium responsive to differential quantities of light received by the first and second light-receiving portions.

11. An apparatus according to claim 10, further comprising control means for performing a focus servo control in accordance with light received by said first light-receiving portion of said light-receiving means.

12. An apparatus according to claim 11, wherein said control means performs a focus servo control based on a focus error detected according to the astigmatism method.

13. An apparatus according to claim 10, further comprising control means for performing a focus servo control in accordance with the quantity of light received by one of said first light-receiving portion and said first and second light-receiving portions depending upon the type of recording media identified by the discriminator.

14. An apparatus according to claim 10, wherein said second light-receiving portion is divided into a plurality of regions corresponding to said first light-receiving portion, said apparatus further comprising control means for performing focus servo control in accordance with the quantity of light received by one of said first light-receiving portion and said first and second light-receiving portions depending upon the type of recording media identified by the discriminator.

15. An apparatus according to claim 10, further comprising reproduction means for reading information recorded on said recording medium in accordance with the quantity of light received by one of said first light-receiving portion and said first and second light-receiving portions depending upon the type of recording media identified by the discriminator.

16. An apparatus according to claim 10, wherein the normalized detector size of said first light-receiving portion of said light-receiving means ranges from 3 to 16 μm.

17. An apparatus according to claim 10, wherein the recording density of said recording medium differs from the recording density of the other of the plurality of types of recording media.

18. An apparatus according to claim 10, wherein the thickness of the substrate forming said recording medium differs from the thickness of the substrate of the other of the plurality of types of recording media.

19. An apparatus according to claim 10, wherein the thickness of the substrate forming said recording medium differs from the thickness of the substrate of the other of the plurality of types of recording media.

20. An apparatus according to claim 19, wherein the wavelength of said laser diode is 635 nm, and the numerical aperture NA of said objective is 0.6.

21. A method for selectively reproducing information from a recording medium selected from a plurality of differing media types by applying light to an information recording layer through a transparent substrate having a thickness, said method comprising the steps of:
  generating light to be applied to the information recording layer of the recording medium;
  converging the light to the information recording layer of said recording medium;
  measuring the focus of the light reflected by said recording medium;
  determining the type of recording media based upon the measured focus of the reflected light; and
  generating a conditioned signal comprising at least a portion of the reflected light based upon the type of recording media;
  whereby, regardless of the type of recording media selected, the conditioned signal can be appropriately interconnected with a reading circuit for further processing.

22. A method according to claim 21 wherein the step of measuring the focus of the reflected light further comprises the step of detecting the reflected light by a first light-receiving portion and a second light-receiving portion.

23. A method according to claim 22 wherein the second light-receiving portion is disposed to surround said first light-receiving portion.

24. A method according to claim 21 a further comprising the step of performing a focus servo control based on the result during the step of measuring the focus of the reflected light.

25. An apparatus according to claim 1 wherein the light-receiving means is divided into a first portion located at a central portion thereof and a second portion located around the periphery of the first portion.

26. An apparatus according to claim 25 wherein the first portion of the light-receiving means is formed in a plurality of regions.

27. An apparatus according to claim 1 wherein the discriminator compares signals from the first portion and the sum of the first and second portions to determine which of the plurality of differing media types comprises the recording medium.

28. An apparatus according to claim 1 wherein the discriminator further comprises a switching device interconnected with a reading circuit, the switching device having a first input operably interconnected with the first portion of the light-receiving means and a second input interconnected with one of the second portion and the sum of the first and second portions of the light-receiving means.

29. An apparatus adapted for selectively reproducing information from a recording medium selected from a plurality of differing media types by applying light to an information recording layer through a transparent substrate having a thickness, said apparatus comprising:
  light-generating means for generating light to be applied to the information recording layer of the recording medium;
  light-applying means for converging the light generated by said light-generating means and applying it to the information recording layer of said recording medium;
  light-receiving means divided into a first portion and a second portion for separately receiving the light reflected by said recording medium; and
  a discriminator operably interconnected with the light-receiving means for determining which of the plurality of differing media types comprises the recording medium, wherein the discriminator further comprises a switching device interconnected with a reading circuit, the switching device having a first input operably interconnected with the first portion of the light-receiving means and a second input interconnected with one of the second portion and the sum of the first and second portions of the light-receiving means, wherein the discriminator further comprises a determination circuit operably interconnected with the switching device for determining whether the signal from one of the first and second inputs of the switching device exceeds a predetermined value whereby the determination circuit can selectively actuate the switching device to send a signal from one of the first and second inputs of the switching device to the reading circuit.

30. An apparatus adapted for selectively reproducing information from a recording medium selected from a plurality of differing media types by applying light to an information recording layer through a transparent substrate having a thickness, said apparatus comprising:
  a light generator adapted to generate light directed at the information recording layer of the recording medium for reflection therefrom;
  a light receiver adapted to receive the light reflected by the recording medium and generate a focus signal corresponding to the degree of focus of the light incident upon the light receiver; and
  a discriminator interconnected with the light receiver adapted to receive the focus signal and generate a reading signal corresponding to the amount of reflected light incident upon the light receiver corrected by the focus signal;

whereby a particular type of recording medium selected from the plurality of differing media types is determined by the degree of focus of the light incident upon the light receiver.

31. An apparatus according to claim 30 and further comprising control means for performing a focus servo control responsive to the focus signal.

32. An apparatus according to claim 30, wherein the light receiver comprises a first portion having a periphery and a second portion disposed around the periphery of the first portion.

33. An apparatus according to claim 32, further comprising a controller for selectively performing a focus servo control in accordance with the quantity of light received by one of the first portion and the first and the second portions of the light receiver when the recording medium is reproduced depending upon the type of recording medium identified by the discriminator.

34. An apparatus according to claim 33, wherein said recording medium is selected from a plurality of types of recording media consisting of: a digital video disc and a compact disc.

* * * * *